Patented July 31, 1928.

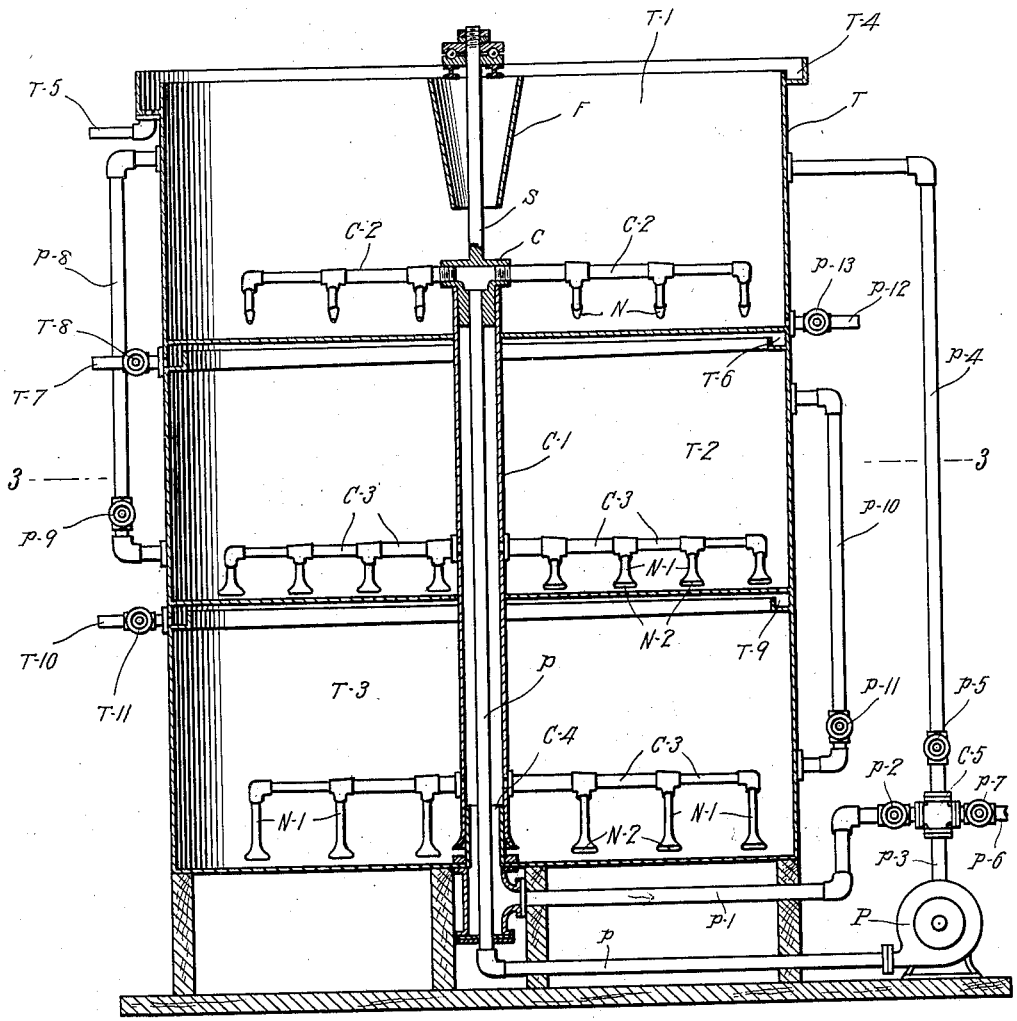

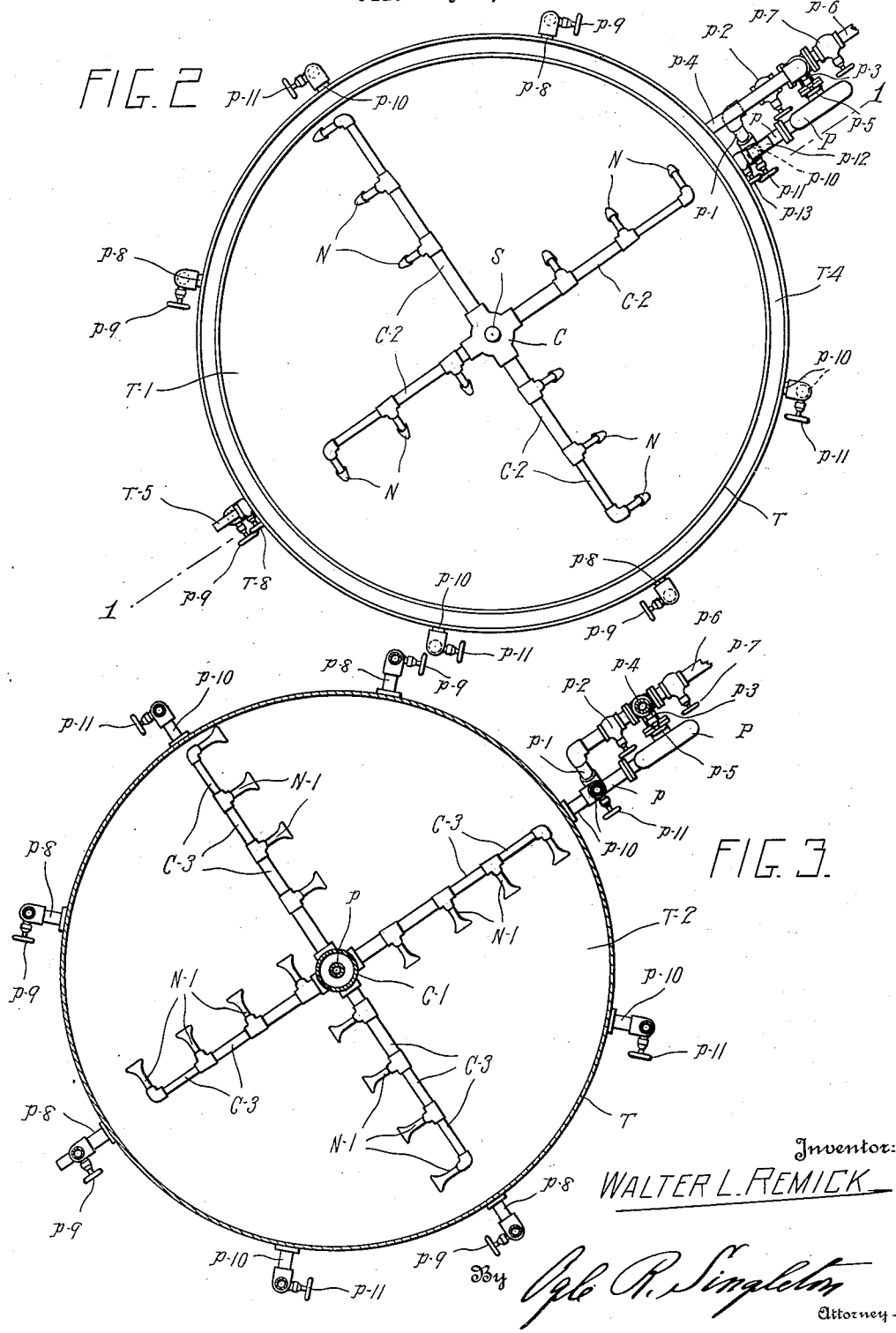

1,678,788

UNITED STATES PATENT OFFICE.

WALTER L. REMICK, OF NEW YORK, N. Y.

PROCESS OF AND APPARATUS FOR THE TREATMENT OF SOLID-BEARING LIQUIDS.

Application filed May 10, 1926. Serial No. 108,042.

My invention consists in a new and useful improvement in the process of and apparatus for the treatment of solid bearing liquids, and is designed particularly for the recovery of finely divided solids carried in suspension in the liquid under treatment. The process consists in circulating the liquid in a receptacle by withdrawing a portion of the liquid from the upper part of the receptacle and discharging it into the lower portion of the receptacle, at the same time withdrawing a portion of the liquid from the receptacle and discharging it into the lower part of a second receptacle, and withdrawing it from the upper part of the second receptacle and discharging it into the lower part of a third receptacle, and continuing this process through as many additional receptacles as may be desired, and at the same time withdrawing by suction settled solids from the bottoms of the said receptacles, except the first receptacle, and returning said recovered solids to the bottom of the first receptacle.

Experience has demonstrated that when a solid bearing liquid is circulated through a receptacle in the manner of my process, the solids carried in suspension in the liquid tend to settle upon the bottom of the receptacle, the liquid at the top of the receptacle becoming consequently clarified. Between the thickened liquid adjacent the bottom of the receptacle and the clarified liquid at the top, there is a portion of the liquid which still carries the finer particles of solids in suspension. It is this liquid which by my improved process is withdrawn from the receptacle and discharged into the lower part of the second receptacle. The tendency there is for the finely divided particles of the solids to settle to the floor of the second receptacle whence they are drawn by suction and returned to the first receptacle to be mingled with the settled solids at the bottom thereof. I have found by experience that not all of the finely divided particles of solids will settle on the bottom of the second receptacle, and I, therefore, subject the liquid in the second receptacle, still bearing finely divided particles of solids, to a repetition of the process of the settling and withdrawal of the finely divided particles of solids, by passing it through one or more additional receptacles, as may be requisite to remove from the liquid substantially all of the finely divided particles of solids to be returned to the first receptacle to be there commingled with the settled solids therein.

The settled solids in the first receptacle may be withdrawn therefrom by any suitable means, and the clarified liquid, freed of the solids, is allowed to flow from the top of the receptacle.

In the drawings filed herewith I have illustrated one specific embodiment of my improved apparatus by which my improved process may be practiced, but it is to be distinctly understood that I do not consider my invention, either as to my process or my apparatus limited by the disclosure of the drawings, or the description thereof, but refer for its scope to the claims appended hereto.

In the drawings:

Fig. 1 is a vertical section on the line 1—1 of Fig. 2.

Fig. 2 is a top plan view of my improved apparatus, the feed shell and central shaft bearing being removed.

Fig. 3 is a horizontal section on the line 3—3 of Fig. 1.

My improved apparatus as illustrated in the drawings comprises a tank T divided into an upper compartment $T^1$, a middle compartment $T^2$ and a lower compartment $T^3$. About the top of the upper compartment $T^1$, I provide an overflow launder $T^4$ with a discharge pipe $T^5$. At the top of the middle compartment $T^2$, I provide an overflow launder $T^6$ within the tank T and provided with a discharge pipe $T^7$ with a valve $T^8$. At the top of the lower compartment $T^3$ and within the tank T, I provide an overflow launder $T^9$ with a discharge pipe $T^{10}$ having a valve $T^{11}$. Centrally disposed relative to the tank T, I provide a vertical rotatable shaft S, suitably supported from above the tank T. This shaft S is provided at its lower end with the cross C from which depends the rotatable, tubular conduit $C^1$ extending downwardly through the center of the tank T. Radiating from the cross C in the upper compartment $T^1$ are the hollow arms $C^2$, each of which is provided with a series of tangentially downwardly projected disposed nozzles N. Centrally disposed relatively to the conduit $C^1$ there is the pipe $p$ connected to the discharge side of the centrifugal pump P and in communication with the nozzles N through the cross C and hollow arms $C^2$. The pipe $p$ and cross C are connected by means of a packed joint, allowing the cross C suspended from the shaft S to rotate about the upper end of the pipe $p$. The conduit $C^1$ is provided in the middle of the compartment $T^2$, and in the middle of the compartment $T^3$, with radially disposed hollow arms $C^3$, each of which is provided with a series of tangentially downwardly projected disposed induct pipes $N^1$ having elongated, flattened openings $N^2$. The induct pipes $N^1$ are in communication with the conduit $C^1$ through the hollow arms $C^3$. The lower end of the conduit $C^1$ is rotatably received on a pipe $C^4$ with which communicates a pipe $p^1$ having a valve $p^2$ connected to a cross $C^5$ which is connected by a pipe $p^3$ with the intake side of the pump P. I provide a pipe $p^4$ entering the upper compartment $T^1$ near its top and communicating with the intake side of the pump P through the cross $C^5$ and pipe $p^3$ and provided with the valve $p^5$. I also provide a supply pipe $p^6$ with valve $p^7$ connected to the cross $C^5$ and the intake side of the pump P through the pipe $p^3$. I provide pipes $p^8$ with valves $p^9$ having their upper ends entering the upper compartment $T^1$ near its top and their lower ends entering the middle compartment $T^2$ on the horizontal plane of the hollow arms $C^3$ in the middle compartment $T^2$. I also provide pipes $p^{10}$ with valves $p^{11}$ having their upper ends entering the middle compartment $T^2$ near its top and their lower ends entering the lower compartment $T^3$ on the horizontal plane of the hollow arms $C^3$ in the lower compartment $T^3$. I provide a discharge pipe $p^{12}$ with valve $p^{13}$ at the bottom of the upper compartment $T^1$. I provide a tubular feed shell F centrally disposed relative to the upper compartment $T^1$.

Having described my invention what I claim is:

1. A process for the treatment of solid bearing liquids which consists in circulating the liquid in a receptacle by withdrawing a portion of the liquid from the upper part of the receptacle and discharging it into the lower part of the receptacle; allowing the solids in the liquid to settle upon the bottom of the receptacle; withdrawing a portion of the liquid from the receptacle and discharging it into the lower part of a second receptacle; allowing the solids in the liquid in the second receptacle to settle upon the bottom of the second receptacle; withdrawing the settled solids from the bottom of the second receptacle; commingling the solids withdrawn from the second receptacle with the settled solids in the first receptacle; and withdrawing the commingled solids from the first receptacle.

2. An apparatus for the treatment of solid bearing liquids which comprises a receptacle; means adapted to circulate a liquid through said receptacle, a second receptacle; means adapted to circulate liquid from the first receptacle through the second receptacle; means adapted to convey settled solids from the second receptacle to the first receptacle; and means adapted to remove settled solids from the first receptacle.

3. An apparatus for the treatment of solid bearing liquids which comprises two receptacles, a series of liquid discharge pipes in one of said receptacles adapted to be rotated by the discharge of liquid under pressure, and a series of suction pipes in the other one of said receptacles adapted to be rotated by the rotation of the series of discharge pipes.

4. An apparatus for the treatment of solid bearing liquids which comprises two receptacles, a series of suction pipes in one of said receptacles adapted to be rotated by the suction exerted through said pipes upon liquid in the receptacle, and a series of discharge pipes in the other one of said receptacles adapted to be rotated by the rotation of the series of suction pipes.

In testimony whereof, I affix my signature.

W. L. REMICK.